United States Patent [19]
Jakab

[11] Patent Number: 5,838,788
[45] Date of Patent: Nov. 17, 1998

[54] TELEPHONE RINGING SIGNAL GENERATOR

[75] Inventor: Gyula Jakab, Nepean, Canada

[73] Assignee: Northern Telecom Limited, Montreal, Canada

[21] Appl. No.: 730,830

[22] Filed: Oct. 17, 1996

[51] Int. Cl.⁶ .............................. H04M 3/02; H04M 5/12
[52] U.S. Cl. ..................... 379/418; 379/252; 379/373; 379/413
[58] Field of Search ................... 379/251, 252, 379/253, 372, 373, 374, 375, 377, 379, 382, 399, 413, 418; 363/97; 327/129; 331/25

[56] References Cited

U.S. PATENT DOCUMENTS

| | | | |
|---|---|---|---|
| 3,904,833 | 9/1975 | Beene et al. | 379/418 |
| 4,015,091 | 3/1977 | Rao et al. | 179/84 R |
| 4,239,935 | 12/1980 | Bosik et al. | 179/84 R |
| 4,340,785 | 7/1982 | Awadalla | 179/51 AA |
| 4,341,928 | 7/1982 | Stanson et al. | 179/51 AA |
| 4,349,703 | 9/1982 | Chea, Jr. | 379/418 |
| 4,500,844 | 2/1985 | Lisco | 379/418 |
| 4,638,122 | 1/1987 | Siligoni et al. | 379/124 |
| 4,720,852 | 1/1988 | Siligoni et al. | 379/124 |
| 5,001,748 | 3/1991 | Burns et al. | 379/418 |
| 5,260,996 | 11/1993 | Dillon et al. | 379/418 |
| 5,307,407 | 4/1994 | Wendt et al. | 379/418 |
| 5,337,208 | 8/1994 | Hossner | 361/93 |

*Primary Examiner*—Scott Wolinsky
*Attorney, Agent, or Firm*—R. John Haley

[57] ABSTRACT

A telephone ringing signal generator includes a DC converter for producing high positive and negative voltages that define peak amplitudes of the ringing signal, which is produced by low pass filtering a generally trapezoidal waveform having these peak amplitudes. The generally trapezoidal waveform is produced by a level-shifting integrator at a frequency determined by a low voltage square wave supplied to the integrator. The integrator comprises a capacitor coupled between a virtual ground point and an output of the integrator and arranged to be charged with two opposite polarities in response to opposite transitions of the square wave, and a resistor via which the square wave is supplied to the virtual ground point. Buffers are provided for buffering the trapezoidal waveform supplied to, and the ringing signal produced by, the low pass filter.

8 Claims, 2 Drawing Sheets

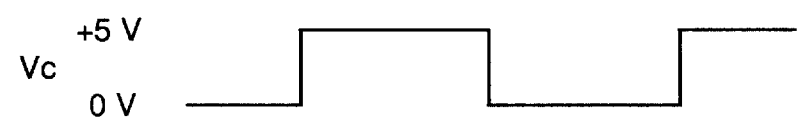
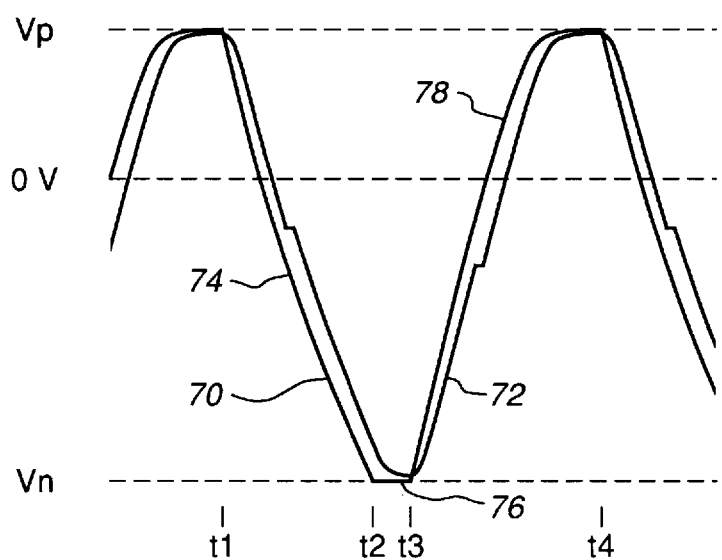

TELEPHONE RINGING SIGNAL GENERATOR

This invention relates to telephone ringing signal generators.

BACKGROUND OF THE INVENTION

It is well known that a low frequency, high voltage signal is required as a ringing signal to alert a telephone subscriber for example to an incoming telephone call. Such a ringing signal was traditionally generated commonly for many subscribers, at a fixed frequency of for example 20 Hz, using a rotating electro-mechanical generator at the telephone central office (C.O.). More recently, other forms of telephone ringing signal generator have been used, especially where different ringing frequencies are required and/or for supplying ringing signals to relatively small numbers of telephone subscriber lines. Such other forms of generator have included low voltage oscillators followed by step-up transformers, and switching power converters followed by low frequency, high voltage waveform synthesizers.

These forms of ringing signal generator involve one or more of the disadvantages of being relatively large, expensive, complex, and inefficient. Consequently, they are not well suited to generating ringing signals in newer telephone systems such as fiber, hybrid fiber-coax, and fixed radio access systems. In such systems, a telephone ringing signal generator is typically required at the subscriber's premises to serve only one or two telephone lines. Especially in such systems, there is a need to provide a telephone ringing signal generator that is small, simple, efficient, and economical.

An object of this invention is to provide a telephone ringing signal generator that enables this need to be met.

SUMMARY OF THE INVENTION

The invention provides a telephone ringing signal generator comprising: a DC converter for producing a high positive voltage and a high negative voltage; a level-shifting integrating circuit responsive to a low voltage square wave control signal at a desired ringing frequency to produce at said frequency a high voltage generally trapezoidal waveform having positive and negative peak amplitudes determined by the high positive voltage and the high negative voltage, respectively; and a low pass filter arranged to filter the high voltage generally trapezoidal waveform to produce a high voltage telephone ringing signal at said frequency.

The generator can include buffers arranged to buffer the telephone ringing signal produced by the low pass filter and for supplying the generally trapezoidal waveform to the low pass filter. The low pass filter can comprise a series resistor and a shunt capacitor.

BRIEF DESCRIPTION OF THE DRAWINGS

The invention will be further understood from the following description with reference to the accompanying drawings, in which:

FIGS. 3A and 3B illustrate waveforms with reference to which operation of the ringing signal generator of FIGS. 1 and 2 is explained.

DETAILED DESCRIPTION

Figure 1:
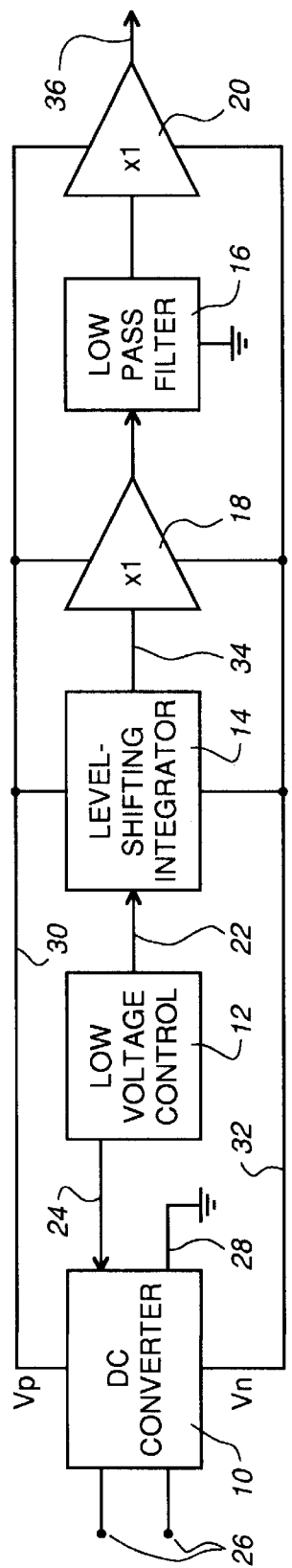
FIG. 1 illustrates a block diagram of a telephone ringing signal generator in accordance with an embodiment of the invention.

Referring to FIG. 1, a telephone ringing signal generator in accordance with an embodiment of the invention comprises a DC converter 10, a low voltage control unit 12, a level-shifting integrator 14, a low pass filter 16, and two unity gain buffers 18 and 20.

The low voltage control unit 12 is for example a micro-controller which selectively generates and supplies on a line 22 a low voltage rectangular waveform at a desired ringing frequency. For example, this waveform can be a 20 Hz square wave having logic levels of 0 and +5 volts as described below. The control unit also produces and supplies on a line 24 a logic control signal for turning on and off operation of the DC converter 10 in known manner, for example via an optical coupler (not shown). These logic level signals can be produced in well known manner by a micro-controller, which can also serve numerous other functions associated with providing telephone communications and not described here. Alternatively, a similar rectangular waveform can be produced by an oscillator constituting the control unit 12, with the DC converter 10 operating continuously or being otherwise controlled.

The DC converter is supplied with AC or DC power from a source (not shown) connected to terminals 26 and produces, relative to ground or 0 volts on a line 28, a high positive output voltage Vp on a line 30 and a high negative voltage Vn on a line 32. These high voltages are chosen to provide a desired amplitude and DC offset of the ringing signal produced by the generator, the DC offset being equal to (Vp+Vn)/2 and the peak amplitude relative to this offset being about (Vp−Vn)/2. As described further below, the magnitude of the negative voltage Vn can conveniently be twice the magnitude of the positive voltage Vp, to provide a negative DC offset equal to −Vp/2 and a peak amplitude of about 3Vp/2.

The high voltages Vp and Vn are supplied to the level-shifting integrator 14, which is controlled by the rectangular waveform on the line 22 to produce on a line 34 a generally trapezoidal waveform as described further below, this generally trapezoidal waveform having the same frequency as the rectangular waveform supplied on the line 22 and swinging between the voltages Vp and Vn. The generally trapezoidal waveform on the line 34 is buffered by the unity gain buffer 18, filtered by the low pass filter 16, and further buffered by the unity gain buffer 20 to produce a telephone ringing signal on an output line 36.

The buffer amplifiers 18 and 20 are supplied with the high voltages Vp and Vn as supply voltages, thereby substantially maintaining the amplitude swing of the waveform on the line 34. This amplitude is determined by the voltages Vp and Vn, and does not depend on the amplitude of the rectangular waveform on the line 22, which is a logic level signal. It can be appreciated that the buffer amplifiers 18 and 20 simply serve for buffering the outputs of the integrator 14 and low pass filter 16 respectively from the subsequent loads, and one or both of them can optionally be omitted.

Figure 2:
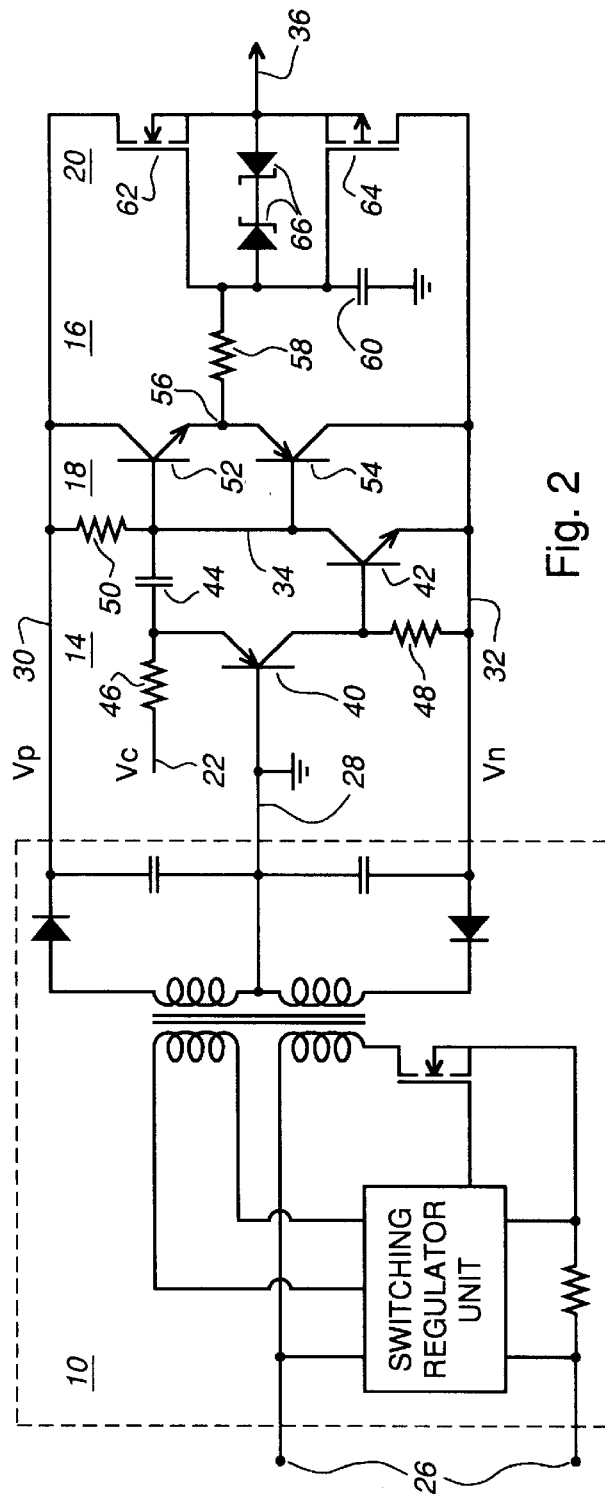
FIG. 2 schematically illustrates a circuit diagram of an implementation of parts of the ringing signal generator of FIG. 1.

Referring to the circuit diagram of FIG. 2, the DC converter 10, shown within a dashed-line box in FIG. 2, is constituted by a switching regulator DC-DC converter of generally known form, comprising a switching regulator unit coupled to a transformer primary winding, switching transistor, and current sensing resistor connected in series between the terminals 26 which in this case are supplied from a DC supply voltage, with secondary windings of the transformer coupled to rectifying and smoothing circuits to produce the voltages Vp and Vn relative to ground on the line 28. A feedback winding of the transformer is also coupled to the switching regulator unit. The DC converter 10 can be designed to operate efficiently at a high frequency and with a small size, being switched on and off as described above to generate the high voltages Vp and Vn only when required. By way of example, Vp=61.5 volts and Vn=−123 volts, these voltages conveniently being provided by a 2:1 turns ratio of the respective secondary windings of the transformer.

The level-shifting integrator 14 comprises transistors 40 and 42, a capacitor 44, and resistors 46, 48, and 50. The transistor 40 is a PNP transistor having its base connected to ground, its emitter connected via the resistor 46 to the line 22 to which the square wave described above is supplied as a control voltage Vc, and its collector connected to the base of the transistor 42 and via the resistor 48 to the negative voltage Vn line 32. The transistor 42 is an NPN transistor having its emitter connected to the line 32 and its collector connected to the positive voltage Vp line 30 via the resistor 50 and providing the output connection line 34. The capacitor 44 is connected between the emitter of the transistor 40 and the collector of the transistor 42.

The buffer 18 is constituted by an NPN transistor 52, having its collector connected to the Vp line 30, and a PNP transistor 54, having its collector connected to the Vn line 32, these transistors 52 and 54 having their bases both connected to the line 34 and their emitters interconnected at a junction 56 constituting an output of the buffer 18. The low pass filter 16 is constituted by a resistor 58 and a capacitor 60 connected in series between the junction 56 and ground respectively, a junction between the resistor 58 and capacitor 60 constituting the output of the low pass filter 16. The buffer 20 is constituted by complementary MOSFETs 62 and 64 having their gates connected to the output of the low pass filter, their sources connected to the Vp and Vn lines 30 and 32 respectively, and their drains connected together and to the output line 36 of the ringing signal generator. Two zener diodes 66 are connected in series with opposite polarities between the gates and drains of the MOSFETs 62 and 64 to protect the gates of the MOSFETs from transient voltages that may appear on the output line 36 from its connection in use to one or more telephone lines.

FIG. 3A illustrates a 20 Hz square wave constituting the control voltage Vc, having logic levels of 0 volts and +5 volts. FIG. 3B illustrates a waveform 70 which constitutes the generally trapezoidal waveform which is consequently produced at the output of the level-shifting integrator 14 on the line 34, and hence at the junction 56 constituting the output of the unity gain buffer 18. FIG. 3B also illustrates a waveform 72 which is produced at the output of the low pass filter 16 and hence constitutes the telephone ringing signal waveform produced on the line 36 at the output of the unity gain buffer 20. These waveforms are produced as described below.

It can be appreciated that, considered without the integrating capacitor 44, the level-shifting integrator 14 constitutes a level-shifter from the logic levels of the control voltage Vc to the high voltages Vp and Vn. With the control voltage Vc=0 volts, there is no base-emitter bias for the transistor 40 so that this is non-conductive, and consequently the transistor 42 is also non-conductive so that its collector (line 34) is substantially at the high positive voltage Vp. With the control voltage Vc=+5 volts, the transistor 40 has its base-emitter junction forward biased so that this transistor is turned on, and consequently the transistor 42 is also turned on so that its collector (line 34) is substantially at the high negative voltage Vn. With the capacitor 44 also present, these sharp level transitions are slowed to result in the waveform 70.

More specifically, a transition of the control voltage Vc from 0 to +5 volts occurs at a time t1, when the transistor 40 is turned off and the line 34 is at the voltage Vp. The emitter of the transistor 40 constitutes a virtual ground, being held at about +0.7 volts by the base-emitter junction of the transistor 40, so that the resistor 46 supplies an almost constant charging current to the capacitor 44. As shown in FIG. 3B by a part 74 of the waveform 70, the voltage on the line 34 therefore changes almost linearly until it reaches the high negative voltage Vn at a time t2. The resistance of the resistor 46 and the capacitance of the capacitor 44 are selected so that the time t2 occurs before a subsequent time t3 at which the control voltage Vc changes from +5 to 0 volts. During the time interval from t2 to t3, the line 34 is at the high negative voltage Vn as shown by a part 76 of the waveform 70.

At the time t3 when the control voltage Vc becomes 0 volts, the transistors 40 and 42 are turned off. The capacitor 44 is then charged with opposite polarity via the resistors 50 and 46, this providing an exponential voltage change on the line 34 from Vn to Vp, as shown in FIG. 3B by a part 78 of the waveform 70. The resistances of the resistors 50 and 46 and the capacitance of the capacitor 44 are also chosen so that this exponential charging is substantially completed by a time t4 at which the control voltage Vc again changes to +5 volts.

It can be seen from FIG. 3B that the waveform 70 thus has a generally trapezoidal shape. This waveform is filtered by the first order low pass filter 16 constituted by the resistor 58 and capacitor 60, and buffered by the unity gain buffer 20, to produce the waveform 72 of the generated ringing signal on the output line 36. The widths of the relatively constant-amplitude parts of the generally trapezoidal waveform 70, e.g. the part 76 of this waveform, are arranged to be sufficient that the low pass filtering does not substantially reduce the peak positive and negative voltages of the ringing signal; as shown in FIG. 3B the peaks of the waveform 72 almost reach the voltages Vp and Vn.

Conversely, the widths of these relatively constant-amplitude parts of the generally trapezoidal waveform 70 are not made so great (i.e. the charging times of the capacitor 44 made so short) that the waveform 70 becomes substantially rectangular, because this would result in the ringing signal waveform having an unacceptably low crest factor. As is well known, the crest factor is the ratio of peak to RMS voltage of the ringing signal waveform. For a square wave the crest factor is 1.0, whereas for a telephone ringing signal waveform the crest factor is generally required to be in a range from 1.2 to 1.6.

Although the above description refers to a frequency of 20 Hz of the control voltage Vc and hence of the generated ringing signal on the line 36, it can be appreciated that the generator is operable in a similar manner over a range of frequencies without any change in the component values of the generator. More particularly, the generator can be arranged to operate effectively with a single set of component values at frequencies for example from about 16 Hz to about 50 Hz, the ringing signal frequency being determined simply by the frequency of the control voltage Vc. At the low frequency end of this range the crest factor is reduced as the generally trapezoidal waveform tends towards being more rectangular, and at the high frequency end of this range the crest factor is increased and the peak amplitudes of the ringing signal start to be reduced, with a corresponding lower efficiency of the generator.

By way of example, the following component values may be used in the ringing signal generator of FIG. 3:

| Capacitor 44: | 4.7 nF | Resistor 46: | 51 kΩ |
| --- | --- | --- | --- |
| Resistor 48: | 16.9 kΩ | Resistor 50: | 220 kΩ |
| Resistor 58: | 150 kΩ | Capacitor 60: | 22 nF |

It can be appreciated from the above description that the invention facilitates the provision of a relatively simple, small, economical, and efficient telephone ringing signal generator, which can easily be operated with different ringing frequencies and cadences through control of the control voltage Vc by the control unit 12, and which is particularly well suited for producing ringing signals for individual telephone lines or for small numbers of telephone lines.

Although a particular embodiment of the invention has been described in detail, it should be appreciated that numerous modifications, variations, and adaptations may be made without departing from the scope of the invention as defined in the claims. For example, other forms of DC converter, integrator, and low pass filter may be provided.

What is claimed is:

1. A telephone ringing signal generator comprising:
   a DC converter for producing a high positive voltage and a high negative voltage;
   a level-shifting integrating circuit coupled to the high positive voltage and the high negative voltage and responsive to a low voltage square wave control signal at a desired ringing frequency supplied to a virtual ground point to produce at said frequency a high voltage generally trapezoidal waveform having positive and negative peak amplitudes determined by the high positive voltage and the high negative voltage, respectively; and
   a low pass filter arranged to filter the high voltage generally trapezoidal waveform to produce a high voltage telephone ringing signal at said frequency.

2. A telephone ringing signal generator as claimed in claim 1 wherein the level-shifting integrating circuit comprises a capacitor coupled between the virtual ground point and an output of the integrating circuit and arranged to be charged with two opposite polarities in response to opposite transitions of the control signal, and a resistor via which the control signal is supplied to the virtual ground point.

3. A telephone ringing signal generator comprising:
   a DC converter for producing a high positive voltage and a high negative voltage;
   a level-shifting integrating circuit coupled to the high positive voltage and the high negative voltage and responsive to a low voltage square wave control signal at a desired ringing frequency supplied to a virtual ground point to produce at said frequency a high voltage generally trapezoidal waveform having positive and negative peak amplitudes determined by the high positive voltage and the high negative voltage, respectively;
   a high voltage unity gain buffer coupled to the high positive voltage and the high negative voltage and having an input, coupled to an output of the level-shifting integrating circuit for receiving the high voltage generally trapezoidal waveform, and an output; and
   a low pass filter having an input coupled to the output of the buffer and arranged to filter the high voltage generally trapezoidal waveform to produce a high voltage telephone ringing signal at said frequency.

4. A telephone ringing signal generator as claimed in claim 3 wherein the level-shifting integrating circuit comprises a capacitor coupled between the virtual ground point and the output of the integrating circuit and arranged to be charged with two opposite polarities in response to opposite transitions of the control signal, and a resistor via which the control signal is supplied to the virtual ground point.

5. A telephone ringing signal generator comprising:
   a DC converter for producing a high positive voltage and a high negative voltage;
   a level-shifting integrating circuit coupled to the high positive voltage and the high negative voltage and responsive to a low voltage square wave control signal at a desired ringing frequency supplied to a virtual ground point to produce at said frequency a high voltage generally trapezoidal waveform having positive and negative peak amplitudes determined by the high positive voltage and the high negative voltage, respectively;
   a low pass filter arranged to filter the high voltage generally trapezoidal waveform to produce a high voltage telephone ringing signal at said frequency; and
   a high voltage unity gain buffer coupled to the high positive voltage and the high negative voltage and arranged to couple an output of the low pass filter to an output of the telephone ringing signal generator.

6. A telephone ringing signal generator as claimed in claim 5 wherein the level-shifting integrating circuit comprises a capacitor coupled between the virtual ground point and an output of the integrating circuit and arranged to be charged with two opposite polarities in response to opposite transitions of the control signal, and a resistor via which the control signal is supplied to the virtual ground point.

7. A telephone ringing signal generator comprising:
   a DC converter for producing a high positive voltage and a high negative voltage;
   a level-shifting integrating circuit coupled to the high positive voltage and the high negative voltage and responsive to a low voltage square wave control signal at a desired ringing frequency to produce at said frequency a high voltage generally trapezoidal waveform having positive and negative peak amplitudes determined by the high positive voltage and the high negative voltage, respectively;
   a first high voltage unity gain buffer coupled to the high positive voltage and the high negative voltage and having an input, coupled to an output of the level-shifting integrating circuit for receiving the high voltage generally trapezoidal waveform, and an output;
   a low pass filter having an input coupled to the output of the first buffer and arranged to filter the high voltage generally trapezoidal waveform to produce a high voltage telephone ringing signal at said frequency; and
   a second high voltage unity gain buffer coupled to the high positive voltage and the high negative voltage and arranged to couple an out put of the low pass filter to an output of the telephone ringing signal generator.

8. A telephone ringing signal generator as claimed in claim 7 wherein the level-shifting integrating circuit comprises a capacitor coupled between a virtual ground point and the output of the integrating circuit and arranged to be charged with two opposite polarities in response to opposite transitions of the control signal, and a resistor via which the control signal is supplied to the virtual ground point.

* * * * *